United States Patent
Barr et al.

(10) Patent No.: US 7,058,828 B2
(45) Date of Patent: Jun. 6, 2006

(54) SYSTEM, METHOD AND APPARATUS FOR THE FREQUENCY MANAGEMENT OF BLADES IN A BLADED ARCHITECTURE BASED ON PERFORMANCE REQUIREMENTS

(75) Inventors: Andrew H. Barr, Roseville, CA (US); Ricardo Espinoza-Ibarra, Carmichael, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 505 days.

(21) Appl. No.: 10/216,437

(22) Filed: Aug. 12, 2002

(65) Prior Publication Data

US 2004/0030944 A1   Feb. 12, 2004

(51) Int. Cl.
   *G06F 1/26* (2006.01)
(52) U.S. Cl. .................. 713/320; 713/300; 713/322
(58) Field of Classification Search ............... 713/300, 713/320, 322, 375
   See application file for complete search history.

(56) References Cited

U.S. PATENT DOCUMENTS

| | | | |
|---|---|---|---|
| 5,491,787 A * | 2/1996 | Hashemi | 714/11 |
| 6,141,762 A | 10/2000 | Nicol et al. | |
| 6,191,499 B1 | 2/2001 | Severson et al. | |
| 6,233,635 B1 | 5/2001 | Son | |
| 6,804,790 B1 * | 10/2004 | Rhee et al. | 713/320 |
| 6,836,849 B1 | 12/2004 | Brock et al. | |
| 6,859,882 B1 * | 2/2005 | Fung | 713/300 |
| 2002/0007463 A1 | 1/2002 | Fung | |
| 2003/0120963 A1 * | 6/2003 | Jahnke | 713/322 |

FOREIGN PATENT DOCUMENTS

EP   749060 A1   12/1996

OTHER PUBLICATIONS

Search Report issued on Jan. 20, 2004 in counterpart foreign application in GB under application No. 317525.2.
Hong, et al., Synthesis Techniques for Low-Power Hard Real-Time Systems on Variable Voltage Processors, Dec. 1998, IEEE, p. 10.

* cited by examiner

*Primary Examiner*—Chun Cao
*Assistant Examiner*—Albert Wang

(57) ABSTRACT

In a system, method and apparatus for managing the operating frequency of blades in a blade-based computer system based upon performance requirements, a first blade that requires a specific power allocation is operated at a specific frequency and consumes a portion of the thermal and power budget for the blade-based computer system. A second blade that requires a specific power allocation is operated at a specific frequency and consumes a portion of the thermal and power budget for the blade-based computer system. Additionally, the overall power and thermal budget of the blade-based computer system is maintained.

21 Claims, 6 Drawing Sheets

800

900

SYSTEM, METHOD AND APPARATUS FOR THE FREQUENCY MANAGEMENT OF BLADES IN A BLADED ARCHITECTURE BASED ON PERFORMANCE REQUIREMENTS

CROSS-REFERENCE TO RELATED APPLICATIONS

This application is related to U.S. patent application Ser. No. 10/216,438 (Attorney Docket No. 100202607-1), entitled "SYSTEM AND METHOD FOR THE FREQUENCY MANAGEMENT OF COMPUTER SYSTEMS TO ALLOW CAPACITY ON DEMAND" to Andrew H. BARR, et al.; U.S. patent application Ser. No. 10/261,283 (Attorney Docket No. 100202610-1), entitled "SYSTEM, METHOD AND APPARATUS FOR PERFORMANCE OPTIMIZATION AT THE PROCESSOR LEVEL" to Ricardo ESPINOZA-IBARRA, et al.; U.S. patent application Ser. No. 10/216,234 (Attorney Docket No. 100202612-1), entitled "SYSTEM AND METHOD FOR LOAD DEPENDENT FREQUENCY AND PERFORMANCE MODULATION IN BLADED SYSTEMS" to Ricardo ESPINOZA-IBARRA, et al.; U.S. patent application Ser. No. 10/216,284 (Attorney Docket No. 100202878-1), entitled "VOLTAGE MANAGEMENT OF BLADES IN A BLADED ARCHITECTURE BASED ON PERFORMANCE REQUIREMENTS" to Andrew H. BARR, et al.; U.S. patent application Ser. No. 10/216,286 (Attorney Docket No. 100202880-1), entitled "VOLTAGE MODULATION IN CONJUNCTION WITH PERFORMANCE OPTIMIZATION AT PROCESSOR LEVEL" to Andrew H. BARR, et al.; U.S. patent application Ser. No. 10/216,285 (Attorney Docket No. 100202881-1), entitled "SYSTEM AND METHOD FOR MANAGING THE OPERATING FREQUENCY OF PROCESSORS OR BLADES" to Ricardo ESPINOZA-IBARRA, et al.; U.S. patent application Ser. No. 10/216,229 (Attorney Docket No. 100202882-1), entitled "SYSTEM AND METHOD FOR MANAGING THE OPERATING FREQUENCY OF BLADES IN A BLADED-SYSTEM" to Ricardo ESPINOZA-IBARRA, et al.; U.S. patent application Ser. No. 10/216,223 (Attorney Docket No. 100202916-1), entitled "VOLTAGE MANAGEMENT OF PROCESSORS IN A BLADED SYSTEM BASED ON LOADING" to Andrew H. BARR, et al.; U.S. patent application Ser. No. 10/216,232 (Attorney Docket No. 100203096-1), entitled "SYSTEM AND METHOD FOR VOLTAGE MANAGEMENT OF A PROCESSOR TO OPTIMIZE PERFORMANCE AND POWER DISSIPATION" to Andrew H. BARR, et al., and U.S. patent application Ser. No. 10/216,435 (Attorney Docket No. 100203638-1), entitled "MANAGEMENT OF A MEMORY SUBSYSTEM" to Andrew H. BARR, et al., all of which are concurrently being filed herewith under separate covers, the subject matters of which are herein incorporated by reference.

BACKGROUND

Bladed servers, or bladed computer systems, are computing systems that provision servers or other computer resources on individual cards, or blades. There are many types of blades—processor blades, server blades, storage blades, network blades, etc.—and one or more of each type of blade is typically housed together in a single structure, thus creating high-density computing systems with modular architectures, ensuring flexibility and scalability of the systems, and reducing space requirements. Server blades, along with storage, networking, and other blades, are typically installed in a rack-mountable enclosure, or chassis, which hosts multiple blades. The multiple blades share common resources such as cabling, power supplies, and cooling fans.

The telecommunications industry has been using blade server technology for many years. More generally, the condensed blade server architecture benefits people and businesses that: (1) use the Internet to generate revenue and to provide services to customers; (2) are moving some of their business processes to the Web; and/or (3) need the flexibility to deploy Internet-edge applications in their own data center. Because of recent developments in technology, blade servers are now used for applications such as Web hosting, Web caching, and content streaming.

In Web caching applications, frequently-requested Web content is stored closer to the user, thus allowing for quicker retrieval of objects by the user and reducing the time and bandwidth required to access the Internet. Since companies and individuals are now streaming media (e.g., video and audio) to more effectively communicate both internally and externally, a massive growth of rich media content delivery on the Internet has occurred. Bladed servers are being used to meet the new demands created as a result of this growth.

Though bladed servers provide many advantages, several engineering challenges arise when using bladed servers. Among these challenges is the challenge of designing and operating a bladed system such that sufficient heat is dissipated in the limited space available in the chassis that hosts the system. To address heat dissipation challenges, bladed server systems are designed within an underlying power and thermal envelope. For example, when a chassis that hosts a bladed system has a limited amount of airflow available to cool the blades (i.e., when the system can only dissipate a limited amount of heat), then the chassis is designed for a limited amount of power consumption and an associated limited performance of the blades. Some known power limiting strategies include powering down a CPU functional unit, e.g., a floating-point unit or an on-die cache, or trading off speed for reduced power consumption in a hard drive.

In a system where the ability of the chassis to cool is limited to X and there are Y blades, each blade can only approximately contribute X/Y to the dissipated power in the chassis. Thus, each blade is limited to the performance associated with an X/Y power level.

In a bladed architecture, multiple blades, each representing a separate system, are present in the same chassis. Associated with the chassis are a specific set of power and thermal requirements. Specifically, these requirements put a limit on the amount of power that can be consumed by the blades. This power limitation puts a limitation on the frequency that the processors on the blade can run, and thus limits the performance.

Prior solutions included running all the blades at a performance level less than the blades' maximum in order to meet the overall chassis power and thermal cooling budget. Thus, the performance of each blade is limited to fall within these budgets.

SUMMARY

In one embodiment of the frequency management of blades in a bladed architecture based on performance requirements, a first blade that requires a specific power allocation is operated at a specific frequency and consumes a portion of the thermal and power budget for the blade-based computer system. A second blade that requires a specific power allocation is operated at a specific frequency and consumes a portion of the thermal and power budget for the blade-based computer system. Additionally, the overall power and thermal budget of the blade-based computer system is maintained.

In another embodiment of the frequency management of blades in a bladed architecture based on performance requirements, a first blade that requires a specific power allocation is operated at a specific frequency and consumes a portion of the thermal and power budget for the blade-based computer system. A second blade that requires a specific power allocation is operated at a specific frequency and consumes a portion of the thermal and power budget for the blade-based computer system. Additionally, a means to maintain the frequency level of at least the first blade or second blade is utilized.

DESCRIPTION OF THE DRAWINGS

The detailed description will refer to the following drawings, wherein like numerals refer to like elements, and wherein.

DETAILED DESCRIPTION

Figure 1:
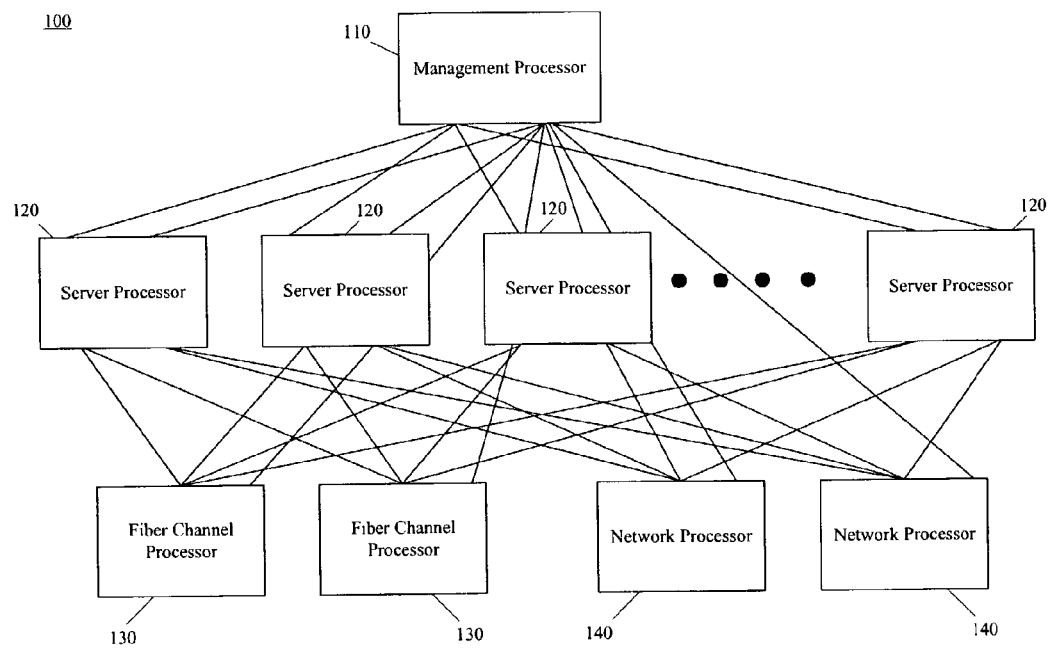
FIG. 1 shows a block diagram depicting one embodiment of the basic modular building blocks of a bladed architecture system.

The preferred embodiments of the frequency management of blades in a bladed architecture based on performance requirements will now be described in detail with reference to the following figures, in which like numerals refer to like elements. With reference to FIG. 1 of the Drawings, there is illustrated therein a block diagram depicting one embodiment of the basic modular building blocks of a bladed architecture system, as generally designated by the reference numeral 100. A management blade 110 supervises the functions of the chassis and provides a single interface to the consoles of all the servers installed. As shown in FIG. 1, server blades 120 are in communication with the management blade 110. The server blades 120 are, in turn, in communication with other blades that perform specific functions. For example, as seen in FIG. 1, server blades 120 are in communication with fiber channel blades 130 and network blades 140. It is to be appreciated that the various blades in a bladed architecture system may be processor blades, server blades, network blades, storage blades or storage interconnect blades, etc.

As discussed above, it is desirous to create a bladed architecture system in which each blade may run at a different frequency even though the blades may have the same exact hardware and software. Blades that host applications that require higher performance are allowed to run at an increased frequency, and thus consume more of the chassis thermal and power budget. Blades that host applications that require a lower level of performance are run at a lower frequency, and thus consume less of the chassis thermal and power budget. As a result, the overall thermal and power requirements are still met on average, yet a more optimal performance solution is reached. Further, as the relative performance requirements on the blades change, the frequencies for the blades can be changed, thus changing the performance and thermal/power budget allocation. It is to be appreciated that the apparatus and methods disclosed herein can be applied to PA, IA-32, IA-64 or any processor blade technology.

FIGS. 2–7 illustrate various methods for managing the operating frequency of the various processors or blades based upon performance requirements. In some bladed architectures, the processor core frequency of the CPU is asynchronous to the bus operating frequency; therefore, a change to the processor core frequency can be made independently of the system bus frequency. Currently, Hewlett Packard uses the SPHYR-T ASIC as a frequency-synthesizer for generating the processor clock of the PA-RISC systems. However, one skilled in the art would readily recognize that other synthesizers may also be used. In other embodiments of processor architectures, e.g., IA-32 and IA-64, the processor core frequency of the CPU is not necessarily asynchronous to the bus operating frequency. In IA processors the processor core frequency runs at a programmable multiple of the bus operating frequency. Managing the operating frequency of individual blades can be applied to both architectures by modifying the output of the clock chip, and thus, setting the processor frequency accordingly.

Generally, frequency synthesizer chips used to generate the processor's clocks have parallel or serialized configuration bits that allow one to choose the ratio of the input clock to the output clock (synthesized frequency). This allows one to run the processors at a different frequency upon reboot of the blade. The frequency synthesizer typically has an input frequency from a core crystal. Through controlling the serial or parallel pins, the frequency synthesizer provides the output frequency ratio that is sent to the processors.

One skilled in the art would also appreciate that if multiple frequency synthesizers are utilized, i.e., two (for a 2-way system) or N (for an N-way system), to generate the processor's clocks, the processors are able to operate at different frequencies within the range of frequencies supported by the processor. FIGS. 2–6 illustrate different methodologies of the how the ratio pins of the different frequency synthesizers can be controlled. It is to be appreciated the below described methodologies are used to modulate the frequency at the blade system level.

Figure 2:
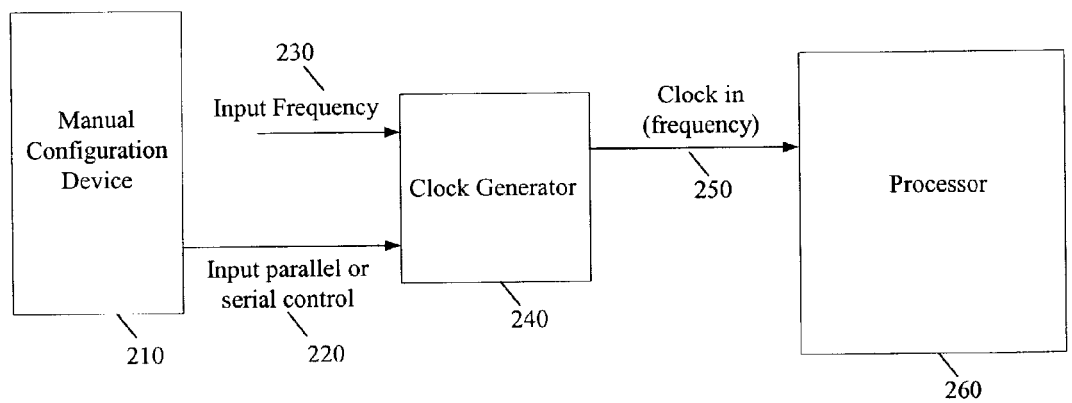
FIG. 2 illustrates a block diagram depicting one methodology of managing the operating frequency of individual blades by use of a manual configuration device.

With reference now to FIG. 2 of the Drawings, there is illustrated therein a block diagram depicting one methodology of managing the operating frequency of individual blades by use of a manual configuration device 210, as generally designated by the reference numeral 200. As seen in the figure, the manual configuration device 210 is added to a readily accessible part of the system. One of ordinary skill in the art would recognize that there are many common manual configuration devices that are capable of performing the desired function, e.g., dip switches, jumpers installed over pin headers, rotational configuration switches, and solder bridges, etc. Thus, the operator is allowed to set the frequency of the processors upon reboot of the unit, based on predetermined performance requirements. The input frequency 230 and signal 220 from the manual configuration device 210 are used to generate an output frequency 250 at the clock generator, or frequency synthesizer, 240 that is used by the processors for the blade 260. It is to be appreciated that this method of changing the frequency of the blade by use of a manual configuration device, and the other methods described herein below, may be applied to various types of processor architectures, e.g., PA-RISC, DEC Alpha, MIPS, PowerPC, SPARC, IA-32 and IA-64.

Figure 3:
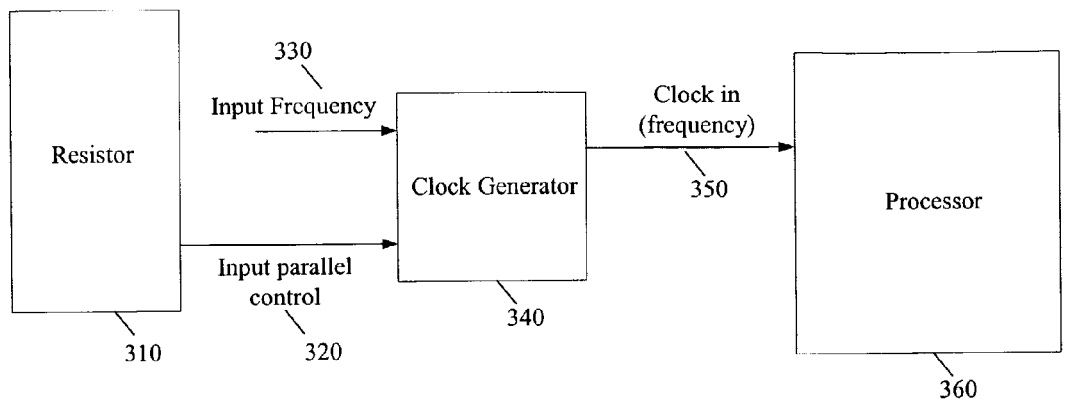
FIG. 3 illustrates a block diagram depicting another method of managing the operating frequency of individual blades by use of resistors.

With reference now to FIG. 3 of the Drawings, there is illustrated therein a block diagram depicting another method of managing the operating frequency of individual blades, as generally designated by the reference numeral 300. Method 300 manages the operating frequency of individual blades by use of a resistor 310. As seen in FIG. 3, the resistor 310 is added to a readily accessible part of the system. Thus, the operator is allowed to set the frequency of the blades upon reboot of the unit, based on predetermined performance requirements. An input frequency 330 and signal 320 from the resistor 310 are used to generate an output frequency 350 at a clock generator 340 that is used by processors on the blade 360.

Figure 4:
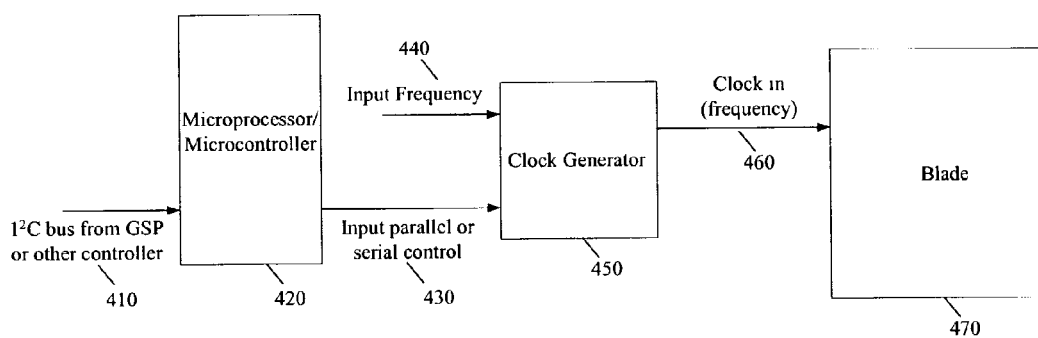
FIG. 4 illustrates a block diagram depicting another method of managing the operating frequency of individual blades by use of a microcontroller or microprocessor.

With reference now to FIG. 4 of the Drawings, there is illustrated therein a block diagram depicting the method of managing the operating frequency of individual blades by use of a microcontroller or microprocessor 420, as generally designated by the reference numeral 400. The microcontroller or microprocessor 420 is used to interface with the user of the system to ask for the specific frequency at which each blade should run. As seen in FIG. 4, microcontroller or microprocessor 420 receives a signal on an I$^2$C (Inter-IC) bus 410 from a GSP (service processor) or other controller. As is known in the art, an I$^2$C bus is a bi-directional two-wire serial bus that provides a communication link between integrated circuits. Further, a person of ordinary skill in the art would readily recognize that other control buses could perform the same functions and be substituted for the I$^2$C bus described herein. The microcontroller or microprocessor 420 outputs a parallel or serial control 430, based upon the specific frequency designated by the user. A clock generator 450 uses an input frequency 440 and parallel or serial control 430 to generate an output frequency 460 used by the designated blade 470. The use of the microcontroller or microprocessor 420 allows the user to control the frequency synthesizers in a more transparent way than the above described register and manual configuration device methods, i.e., the user does not necessarily need to know how the settings of the configuration bits will affect the output.

Figure 5:
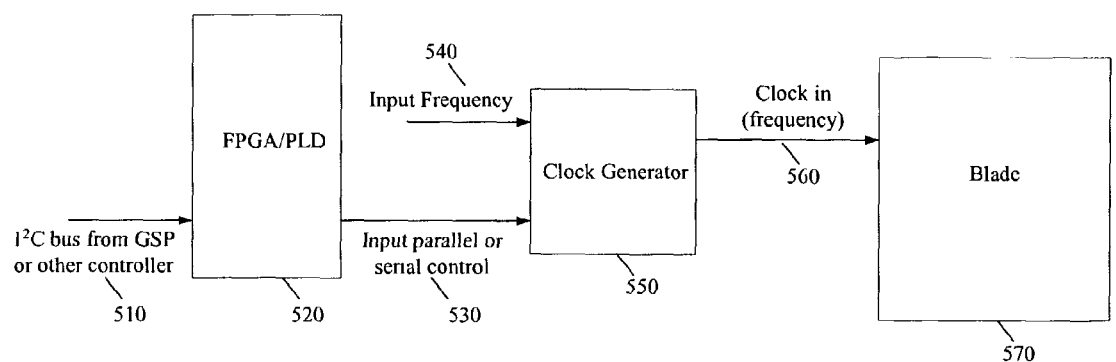
FIG. 5 illustrates a block diagram depicting another method of managing the operating frequency of individual blades by use of a field-programmable gate array (FPGA) or programmable logic device (PLD)

With reference now to FIG. 5 of the Drawings, there is illustrated therein a block diagram depicting the method of managing the operating frequency of individual blades by use of a FPGA (field-programmable gate array) or PLD (programmable logic device) 520, as generally designated by the reference numeral 500. As known in the art, a FPGA is a chip that can be programmed in the field after manufacture. The FPGA or PLD 520 is used to receive commands from a higher-level device, e.g., the GSP via an I$^2$C bus 510, to control the configuration bits for the frequency synthesizer (or each synthesizer). As seen in FIG. 5, a clock generator 550, uses an input frequency 540 and the control from the FPGA/PLD 530 to generate an output frequency 560 used by a processor or blade 570. Like the use of the microcontroller/microprocessor 420 described in FIG. 4, the FPGA/PLD 520 allows the user to control the frequency synthesizers in a more transparent way, i.e., the user does not necessarily need to know how the settings of the configuration bits will affect the output.

Figure 6:
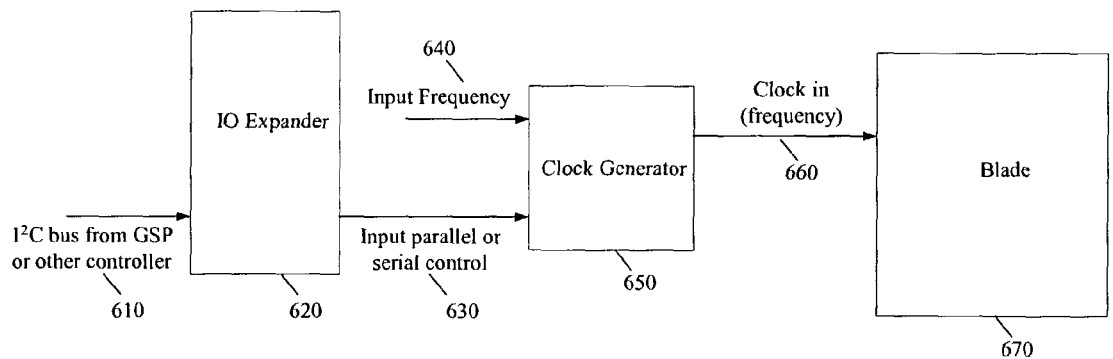
FIG. 6 illustrates a block diagram depicting another method of managing the operating frequency of individual blades by use of an I/O-Expander chip (I/OX)

With reference now to FIG. 6 of the Drawings, there is illustrated therein a block diagram depicting the method of managing the operating frequency of individual blades by use of an I/O-Expander chip (I/OX) 620, as generally designated by the reference numeral 600. As known in the art, an I$^2$C based I/OX 620 is an inexpensive and simple solution that can be used to transparently control each frequency synthesizer. I/OX chips 620 have I/O ports, which can be forced to a particular state by writing to the I/OX through an I$^2$C command. Since I/OX typically have multiple I/O ports, it is to be appreciated that one I/OX can be used to control multiple frequency synthesizers individually.

Since I/OX chips are I$^2$C-based, they can be controlled by any device that supports an I$^2$C interface. In Hewlett Packard's PA-RISC Blades, a logical such device would be the service processor, or GSP, of the PA Blade. The user-friendly interface of the GSP can be used to transparently allow the customer to control the frequency of the processors without need of any low-level information, e.g., bit-settings. The input from the GSP is designated in FIG. 6 by reference numeral 610. The user at the GSP inputs commands to increase the frequency of the processor. The GSP then delivers the required bits to change the ratio of the frequency generator, so that the processor will run at the desired level. The bit stream 610 is received by the I/OX 620. A clock generator 650 then uses an input frequency 640 and a control signal 630 to generate an output frequency 660 used by a processor or blade 670.

Figure 7:
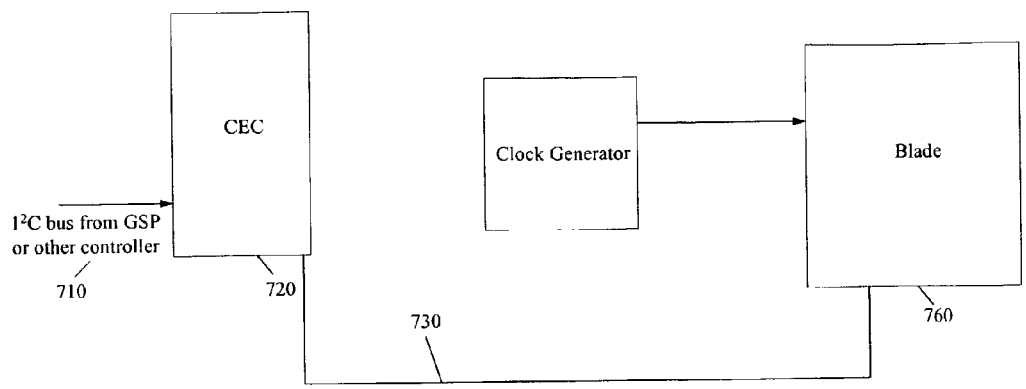
FIG. 7 illustrate therein a block diagram depicting the methods of managing the operating frequency of individual blades in an IA based architecture system.

With reference now to FIG. 7 of the Drawings, there is illustrated therein a block diagram depicting the methods of managing the operating frequency of individual blades in an IA based architecture system, as generally designated by the reference numeral 700. As shown above, PA-based architectures have two frequency inputs that are taken into the processor: the processor core input and the bus input. In IA-based architectures the serial or parallel control is not modulated. IA-based architectures program the processor core frequency to generate a multiple of the bus frequency. The programming of the processor core frequency is done during early bus initialization using multipurpose bus lines 730. This is typically controlled by the main core chipset that sits on the processor bus (CEC) 720. Generally, a user interface, e.g., a GSP 710, is used to program the CEC 720 to generate the appropriate control signal during early system and bus initialization. The bus frequency is multiplied for a larger ratio to generate a higher frequency, performance and power, or for a smaller ratio to generate a lower frequency, performance and power, depending on the application at the particular blade or processor 760.

Figure 8:
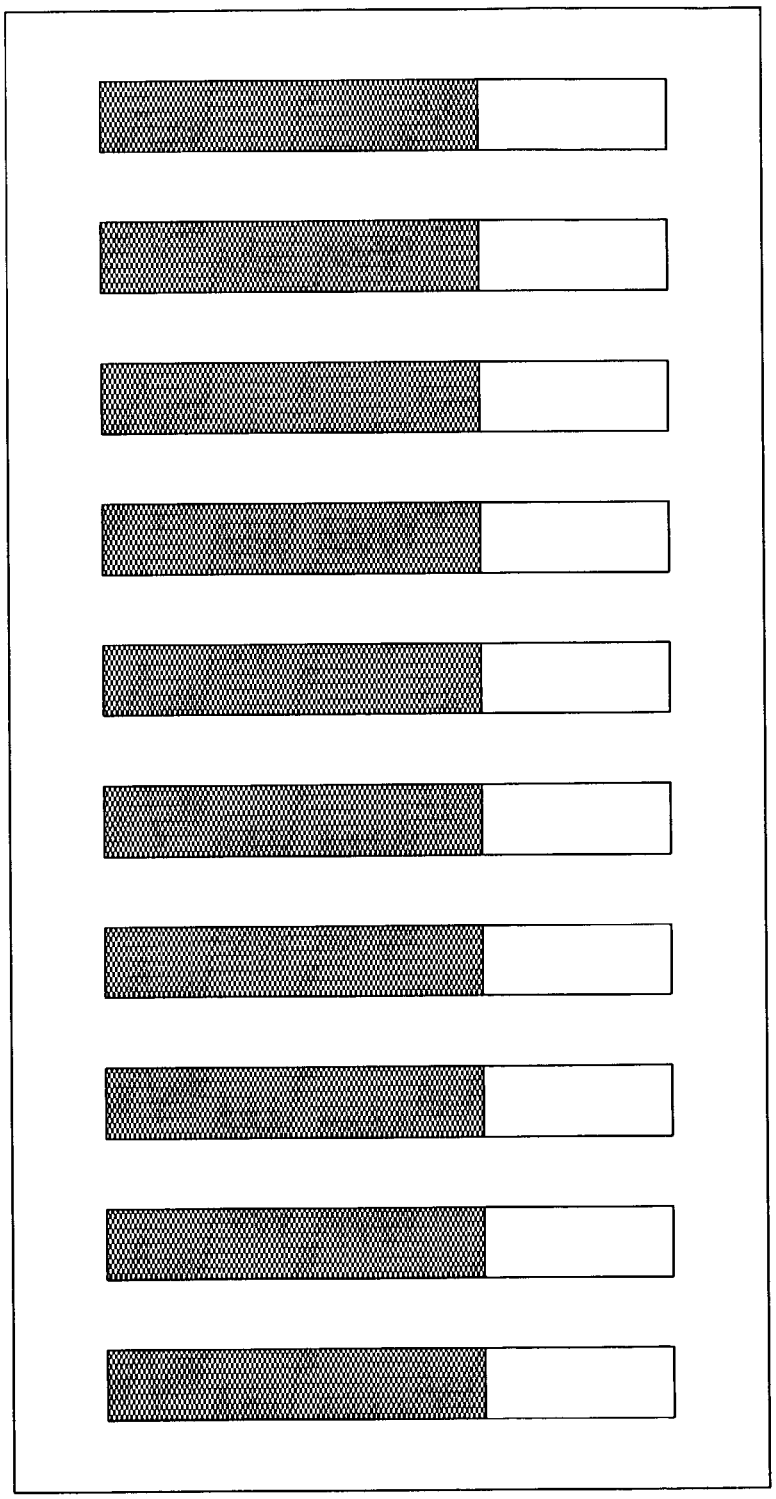
FIG. 8 illustrates a block diagram depicting a series of blades inside of a bladed architecture chassis operating at the same frequency level.

With reference now to FIG. 8 of the Drawings, there is illustrated therein a block diagram depicting a series of blades inside of a bladed architecture chassis running at the same frequency, as generally designated by the reference numeral 800. The shading of the individual blades indicates that each individual blade is operating at the same frequency level. Operating blades at the same frequency is typical in current bladed architecture systems. In addition, the shading illustrates that each blade is operating at a level below the maximum level in order to remain under the maximum power allocated to the system as a whole. As discussed, bladed server systems are limited by an underlying power and thermal envelope. This is due to the heat produced within the blades and to the limited dimensions in the chassis. When the chassis consumes a given amount of the power, the chassis is typically limited in the amount of airflow that is available to cool the blades. As a result, the power limitation limits the frequency that the processors on the blade can run, and thus, limits the performance. The processors within the blades are thus limited in their ability to operate at optimal performance and capacity because the processors are configured to operate at the same frequency—a frequency below their maximum level.

Figure 9:
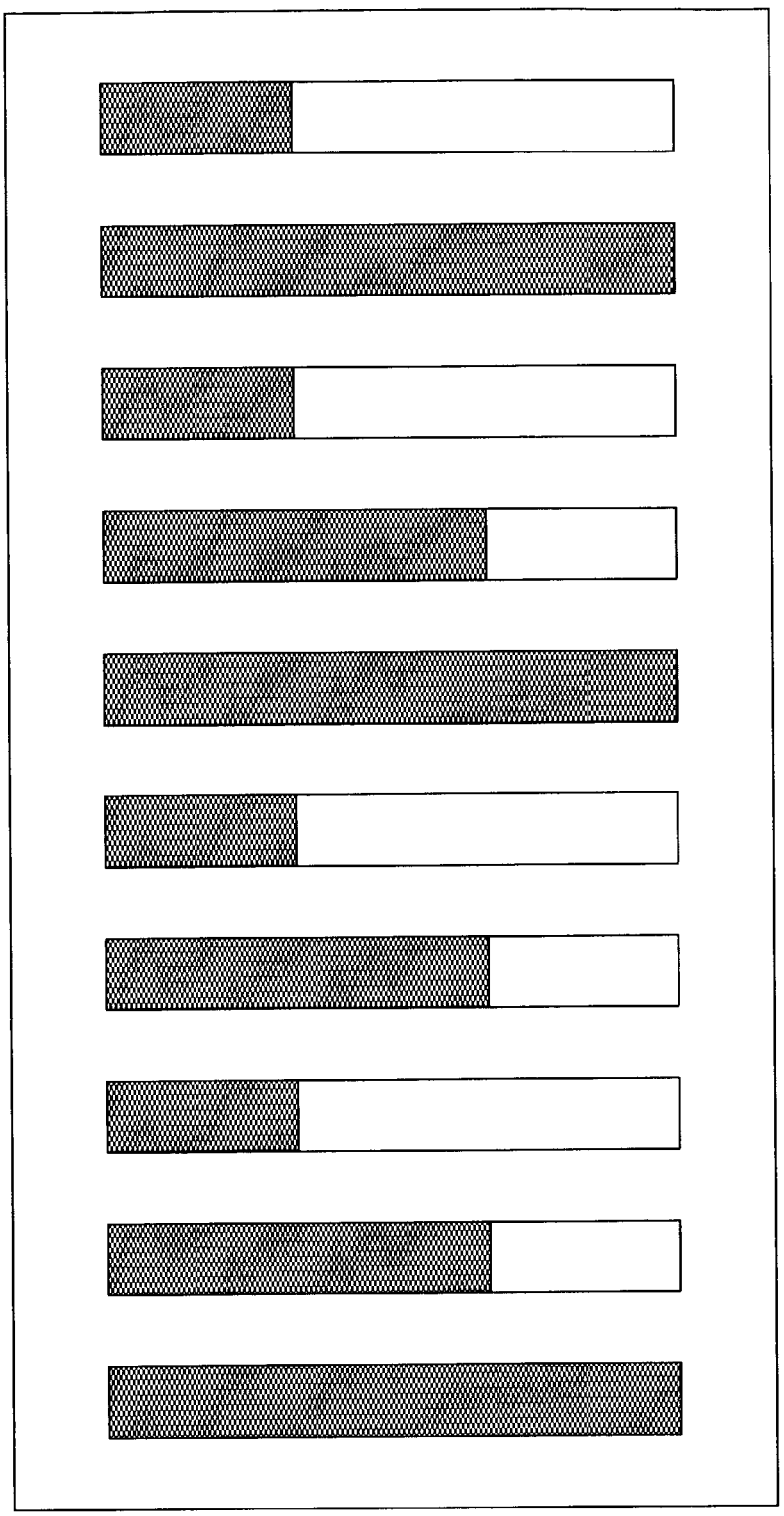
FIG. 9 illustrates a block diagram depicting a series of blades inside of a bladed architecture chassis operating at the different frequency levels.

With reference now to FIG. 9 of the Drawings, there is illustrated therein a block diagram depicting a series of blades inside of a bladed architecture chassis running at different frequencies based upon the individual blades performance requirements, as generally designated by the reference numeral 900. The shading of the figure indicates the level of the frequency at which the blade is being run. As seen in the figure, blades that host applications that require higher performance are allowed to run at an increased frequency, and thus consume more of the chassis thermal and power budget. Blades running at an increased frequency are indicated by the increased shaded area. Blades that host applications that require a lower level of performance are run at a lower frequency, and thus consume less of the chassis thermal and power budget. Blades running at a lower frequency are indicated in the figure by the decreased shaded area. It is to be appreciated that each blade may run at a different frequency even though the blades have the exact same hardware and software.

As is known in the art, the different requirements for the different frequencies is dependent upon the actual applications that each blade is performing. FIG. 9 illustrates that blades with a higher power budget, and thus higher performance are run at a higher frequency, and blades that have a lower power budget, and thus lower performance, are run at a lower frequency, while the overall power and thermal budget for the chassis is maintained. Thus, the overall thermal and power requirements are still met on average, yet a more optimal performance solution is reached. Additionally, when the relative performance requirements on the blades change, the frequencies can be changed, thus changing the performance and thermal/power budget allocation. It is to be appreciated that the principles can be applied to PA, IA32, IA64 or any processor blade technology.

It is to be appreciated that the principles disclosed herein may be applied to a system comprised of processors or blades that share a common chassis or to an architecture system that spans multiple chassis. That is, the principles may be applied to systems that are divided by either a physical or logical partition. For example, physically, a system may include three chassis, with each chassis having eight processors. Logically, the same system could be partitioned into five different web servers for five different customers. Power constraints within a chassis typically concern the physical partition of the system. Power constraints imposed on a customer or application that is located in multiple chassis, typically concern logical partitions. One of ordinary skill in the art would readily recognize that the innovations described above may be applied to both physically and logically partitioned architectures.

While the frequency management of blades in a bladed architecture based on performance requirements has been described in connection with exemplary embodiments, those skilled in the art will understand that many modifications in light of these teaching are possible, and this application is intended to cover any variation thereof.

For example, the disclosed system and method makes use of specific $I^2C$ devices that are used to receive signals from an $I^2C$ bus. Other $I^2C$ devices could likewise be used. Thus, the $I^2C$ devices shown and referenced generally throughout this disclosure, and unless specifically noted, are intended to represent any and all devices/technologies appropriate to perform the desired function. Likewise, there are disclosed several processors and blades that perform various operations. The specific processor or blade is not important to the disclosure. Thus, it is not applicant's intention to limit this disclosure to any particular form of processor, blade or specific blade architecture.

Further examples exist throughout the disclosure, and it is not applicant's intention to exclude from the scope of this disclosure the use of structures, materials, or acts that are not expressly identified in the specification, but nonetheless are capable of performing a claimed function.

The invention claimed is:

1. A method for managing the operating frequency of blades in a blade-based computer system, said method comprising the steps of:

operating a first blade at a first frequency, said first blade hosting applications that require a first power allocation, wherein said first blade consumes a first portion of an overall thermal and power budget of said blade-based computer system based upon said first power allocation;

operating a second blade at a second frequency, said second blade hosting applications that require a second power allocation, wherein said second blade consumes a second portion of the overall thermal and power budget of said blade-based computer system based upon said second power allocation; and maintaining the overall thermal and power budget in said blade-based computer system and optimizing performance of said blade-based computer system by modulating at least one of said first frequency and said second frequency in said blade-based computer system, wherein said first frequency of the first blade is increased based on an increased performance demand by the hosted applications on the first blade and said second frequency of the second blade is decreased based on a decreased performance demand by the hosted applications on the second blade and wherein the increase in the first frequency and the decrease in the second frequency occur simultaneously to optimize performance of said blade-based computer system and to maintain the overall thermal and power budget of said blade-based computer system.

2. The method according to claim 1, wherein said first blade and said second blade contain the same hardware and software.

3. The method according to claim 1, wherein said blade-based computer system is based on an architecture chosen from the group consisting of:

IA-32 and IA-64.

4. The method according to claim 1, wherein the thermal and power budget allocation is altered according to a change in the performance requirements for individual blades in said blade-based computer system.

5. The method according to claim 1, wherein each blade in said blade-based computer system requires a unique power allocation.

6. The method according to claim 5, wherein each blade in said blade-based computer system is run at a frequency dependent upon said unique power allocation.

7. The method according to claim 1, wherein said blade-based computer system is physically partitioned.

8. The method according to claim 1, wherein said blade-based computer system is logically partitioned.

9. A blade-based computer system comprising:
    a first blade hosting applications that require a first power allocation, said first blade operated at a first frequency, wherein said first blade consumes a first portion of an overall thermal and power budget of said blade-based computer system based upon said first power allocation;
    a second blade hosting applications that require a second power allocation, said second blade operated at a second frequency, wherein said second blade consumes a second portion of the overall thermal and power budget in said blade-based computer system based upon said second power allocation; and
    wherein the overall thermal and power budget in said blade-based computer system is maintained and performance in said blade-based computer system is optimized by modulating at least one of said first frequency and said second frequency and wherein said first frequency of the first blade is increased based on an increased performance demand by the hosted applications on the first blade and said second frequency of the second blade is decreased based on a decreased performance demand by the hosted applications on the second blade and wherein the increase in the first frequency and the decrease in the second frequency occur simultaneously to optimize performance of said blade-based computer system and to maintain the overall thermal and power budget of said blade-based computer system.

10. The blade-based computer system according to claim 9, wherein said first blade and said second blade contain the same hardware and software.

11. The blade-based computer system according to claim 9, wherein said blade-based computer system is based on an architecture chosen from the group consisting of:
    IA-32 and IA-64.

12. The blade-based computer system according to claim 9, wherein the thermal and power budget allocation is altered according to a change in the performance requirements for individual blades in said blade-based computer system.

13. The blade-based computer system according to claim 9, wherein each blade in said blade-based computer system requires a unique power allocation.

14. The blade-based computer system according to claim 13, wherein each blade in said blade-based computer system is run at a frequency dependent upon said unique power allocation.

15. A system for managing the operating frequency of blades in a blade-based computer, said system comprising:
    a first blade hosting applications that require a first power allocation, said first blade operated at a first frequency, wherein said first blade consumes a portion of the thermal and power budget in said blade-based computer based upon said first power allocation;
    a second blade hosting applications that require a second power allocation, said second blade operated at a second frequency, wherein said second blade consumes a portion of the thermal and power budget in said blade-based computer based upon said second power allocation; and
    a management means for altering the frequency level of at least said first blade or said second blade, wherein said first frequency of the first blade is increased based on an increased performance demand by the hosted applications on the first blade and said second frequency of the second blade is decreased based on a decreased performance demand by the hosted applications on the second blade and wherein the increase in the first frequency and the decrease in the second frequency occur simultaneously to optimize performance of said blade-based computer system and to maintain the overall thermal and power budget of said blade-based computer system.

16. The system according to claim 15, wherein the overall power and thermal budget in said blade-based computer is maintained by the management means.

17. The system according to claim 15, wherein said first blade and said second blade contain the same hardware and software.

18. The system according to claim 15, wherein said blade-based computer is based on an architecture chosen from the group consisting of:
    IA-32 and IA-64.

19. The system according to claim 15, wherein the thermal and power budget allocation is altered according to a change in the performance requirements for individual blades in said blade-based computer.

20. The system according to claim 15, wherein each blade in said blade-based computer requires a unique power allocation.

21. The system according to claim 20, wherein each blade in said blade-based computer is run at a frequency dependent upon said unique power allocation.

* * * * *